(12) United States Patent
Jeong et al.

(10) Patent No.: US 10,508,828 B2
(45) Date of Patent: Dec. 17, 2019

(54) SPLITTER AND SOUND ATTENUATOR INCLUDING THE SAME

(71) Applicants: S.I.PAN, Gyeonggi-do (KR); KOREA RESEARCH INSTITUTE OF STANDARDS AND SCIENCE, Daejeon (KR)

(72) Inventors: Gab Cheol Jeong, Gyeonggi-do (KR); Eon Mo Ahn, Gyeonggi-do (KR); Jong Young Park, Seoul (KR); Sung Soo Jung, Sejong-si (KR)

(73) Assignees: S.I.PAN, Gyeonggi-do (KR); KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 262 days.

(21) Appl. No.: 15/590,496

(22) Filed: May 9, 2017

(65) Prior Publication Data
US 2018/0238583 A1    Aug. 23, 2018

(30) Foreign Application Priority Data

Feb. 17, 2017 (KR) .................. 10-2017-0021486

(51) Int. Cl.
*F24F 13/24* (2006.01)
*F16L 55/033* (2006.01)
*F24F 13/02* (2006.01)

(52) U.S. Cl.
CPC .......... *F24F 13/24* (2013.01); *F16L 55/0336* (2013.01); *F24F 13/0263* (2013.01); *F24F 2013/242* (2013.01); *F25B 2500/12* (2013.01)

(58) Field of Classification Search
CPC ............... F16L 55/0336; F24F 13/0263; F24F 2013/242; F24F 13/24; F25B 2500/12
(Continued)

(56) References Cited

U.S. PATENT DOCUMENTS 2,916,101 A * 12/1959 Naman ............. F16L 55/02754
181/224
3,734,234 A    5/1973 Wirt
(Continued)

FOREIGN PATENT DOCUMENTS

CN      202117734       1/2012
CN      103003871       3/2013
(Continued)

OTHER PUBLICATIONS

Office Action issued by the Korean Intellectual Property Office dated Oct. 23, 2018.
(Continued)

*Primary Examiner* — Forrest M Phillips
(74) *Attorney, Agent, or Firm* — IP & T Group LLP

(57) ABSTRACT

This technology provides a splitter comprising: a first sound absorber; a second sound absorber; a perforated plate member interposed between the first sound absorber and the second sound absorber; and an outer frame surrounding the first sound absorber, the second sound absorber and the perforated plate member; and a sound attenuator comprising: a protective case; a plurality of splitters according to above embodiment formed in the protective case and spaced from each other; and an air passage formed among the plurality of splitters.

20 Claims, 5 Drawing Sheets

(58) Field of Classification Search
USPC .................................................. 181/292, 224
See application file for complete search history.

(56) References Cited

U.S. PATENT DOCUMENTS

| | | | |
|---|---|---|---|
| 3,831,710 A | | 8/1974 | Wirt |
| 4,068,736 A | * | 1/1978 | Dean .......................... F01N 1/00 181/224 |
| 4,287,962 A | * | 9/1981 | Ingard ...................... F01N 1/003 181/224 |
| 4,316,522 A | * | 2/1982 | Hirschorn ............. F04D 29/664 181/224 |
| 5,117,939 A | | 6/1992 | Noguchi et al. |
| 5,869,792 A | * | 2/1999 | Allen ...................... F01D 25/30 181/224 |
| 5,975,238 A | | 11/1999 | Fuchs et al. |
| 6,035,964 A | * | 3/2000 | Lange ...................... F01D 25/30 181/224 |
| 6,237,717 B1 | | 5/2001 | Osanai et al. |
| 8,307,947 B2 | * | 11/2012 | Bussow .............. F16L 55/0331 181/212 |
| 8,857,563 B1 | * | 10/2014 | Chang ...................... H03H 9/25 181/286 |
| 2002/0050418 A1 | * | 5/2002 | Jenvey ...................... F01N 1/24 181/224 |
| 2002/0053484 A1 | | 5/2002 | Murakami et al. |
| 2003/0221904 A1 | * | 12/2003 | Ludwig ............. F16L 55/02736 181/224 |
| 2005/0045416 A1 | * | 3/2005 | McCarty ............... B01F 5/0453 181/224 |
| 2006/0272886 A1 | * | 12/2006 | Mueller .................. F02C 7/045 181/224 |
| 2014/0133964 A1 | * | 5/2014 | Ayle ..................... G10K 11/172 415/119 |

FOREIGN PATENT DOCUMENTS

| | | |
|---|---|---|
| CN | 202948717 | 5/2013 |
| CN | 204229830 | 3/2015 |
| CN | 105023566 | 11/2015 |
| CN | 105788587 | 7/2016 |
| JP | 60-75510 | 5/1985 |
| JP | 2006112202 | 4/2006 |
| JP | 2009197590 | 9/2009 |
| KR | 1020050035667 | 4/2005 |
| KR | 100918700 | 9/2009 |
| KR | 10-0924958 | 11/2009 |

OTHER PUBLICATIONS

Office Action issued by the Indian Intellectual Property Office dated Aug. 21, 2019.
Office Action issued by the Chinese Patent Office dated Oct. 9, 2019.

* cited by examiner

SPLITTER AND SOUND ATTENUATOR INCLUDING THE SAME

CROSS-REFERENCE TO RELATED APPLICATION

This patent document claims priority of Korean Patent Application No. 10-2017-0021486, entitled "SPLITTER AND SOUND ATTENUATOR INCLUDING THE SAME" and filed on Feb. 17, 2017, which is incorporated herein by reference in its entirety.

TECHNICAL FIELD

This patent document relates to splitters and sound attenuators including the same, more specifically, splitters which can significantly improve the sound absorbing ratio in the low frequency region of 125 Hz or less and exhibit the sound absorbing effect in the middle and high frequency regions by combining porous sound absorbers with sound absorbers using resonance due to vibration of a perforated plate member without the need to excessively increase the length or thickness of the splitters, and sound attenuators having increased performances.

BACKGROUND

For large buildings, it is common to install an air conditioning device to maintain the room under appropriate temperature and humidity conditions. The air conditioning device may cool or warm the air flow created by the supply fan of the air handling unit. The cooled or warmed air may move along the duct and be supplied to the room that needs air-conditioning. In this case, since a loud noise is generated by the supply fan, if the noise is not properly controlled, it may be transmitted to the room and thus, the air conditioning device cannot be practically used. Therefore, it is required to install a sound attenuator for reducing noises in the middle of the duct.

The sound attenuator is a device to reduce or eliminate loud noises. The sound attenuator may be classified into an intake sound attenuator and an exhaust sound attenuator according to the installation location. A muffler which is often used in automobiles or motorcycles is a kind of the exhaust sound attenuator. Moreover, the sound attenuator may be classified into a sound absorption type sound attenuator, an interference type sound attenuator, an expansion type sound attenuator, and a resonance type sound attenuator, and so on according to the sound attenuation method. The sound attenuator which is commonly used in the air conditioning device includes a sound absorber formed in the duct to absorb and reduce noises.

FIG. 1A is a schematic view for illustrating a sound attenuator for an air conditioning device in accordance with a comparative example, and FIG. 1B is a schematic view of a cross-section taken along the line A-A of FIG. 1A.

Referring to FIGS. 1A and 1B, a sound attenuator 10 in accordance with the comparative example may include a protective case 11, a splitter 12 and an air passage 13. The protective case 11 may be formed of a metal, etc. And, the splitter 12 for absorbing sound and the air passage 13 through which air can pass may be formed in the protective case 11. The air flow may be indicated by an arrow in FIG. 1B.

The splitter 12 may include a porous sound absorber 21 and an outer frame 22 surrounding the porous sound absorber 21.

The porous sound absorber 21 may have a plurality of pores or a fibrous structure on the surface of the absorber 21 and inside the absorber 21 to be vibrated by the sound waves of air. As a result of such vibration, friction between materials may occur and sound energy may be converted into heat energy and absorbed.

The outer frame 22 may be formed of a perforated plate which is a thin plate having a plurality of pores.

The splitter 12 may be formed in various shapes other than the shape shown in FIG. 1B.

Performances of the sound attenuator may be expressed as the sound reduction index per unit length. The sound reduction index is proportional to the sound absorbing ratio. As an example, when the attenuator is formed in a lined duct, the sound reduction index R (dB) may be calculated as follows:

$$R = K \cdot \frac{P}{S} l$$

wherein:

$$K = 4.34 \frac{1}{N} \text{ (Provided that } wa/N_c < 1\text{)},$$

P: Cross-sectional length of lined duct (m),
S: Area of lined duct (m²),
l: Length of lined duct (m),
N: Ratio of maximum sound pressure and minimum sound pressure when measuring the normal incidence sound absorbing ratio $\alpha_0$ in the impedance tube,
w: Angular frequency (=2πf),
f: Frequency (Hz),
a: Side length of lined duct (m),
C: Sound velocity (m/s).

Moreover, $\alpha_0$ and N have a relationship represented by the following formula:

$$\alpha_0 = \frac{1}{N + N^{-1} + 2}$$

Accordingly, as the N value is increased, the sound absorbing ratio $\alpha_0$ value is decreased and the sound reduction index per unit length is also decreased. Therefore, it is very important to increase the sound absorbing ratio in the sound attenuator including the splitter because increasing the sound absorbing ratio directly affects the performance of the sound attenuator.

Meanwhile, the sound absorber may be classified into three types, that is, a porous sound absorber, a resonance sound absorber and a plate-type sound absorber according to the method and technical feature of sound absorption.

The porous sound absorber has a plurality of small bubble-like pores or a fibrous structure on the surface of the absorber and inside the absorber, so that it is vibrated by the sound waves of air. As a result of such vibration, friction between materials may occur and sound energy may be converted into heat energy and absorbed. The main sound absorption range of the porous sound absorber may be the high-frequency range of 250 Hz or more. The porous sound absorber may be formed of glass wool, rock wool, foamed resin materials, and fabrics, and so on.

The resonance sound absorber uses a principal of Helmholtz Resonators and is a container of gas (usually air) with an open hole (or neck or port). A volume of air in and near the open hole vibrates because of the 'springiness' of the air inside. When the sound wave with a resonance frequency arrives, it is possible to absorb acoustic energy due to viscous resistance of the open hole. The main sound absorption range of the resonance sound absorber may be the middle frequency range of 125 Hz to 250 Hz. The resonance sound absorber may include a perforated plate having an air layer formed on the rear side of the plate.

The plate-type sound absorber uses resonance due to vibration of the plate. The plate-type sound absorber may exhibit the sound absorbing effect by converting acoustic energy into vibrational energy when a sound wave vibrates the plate. The main sound absorption range of the sound absorber using resonance due to vibration of the plate may be the low frequency range of 125 Hz or less. The plate-type sound absorber may be formed of a metal plate, a vinyl film, and a gypsum wallboard, and so on.

The porous sound absorber is commonly used in the sound attenuator for the air conditioning device. The performance of the porous sound absorber depends on porosity or a thickness of the sound absorber. It is possible to increase the sound absorbing ratio if the thickness of the sound absorber is increased.

Since the noise generated in the air conditioning device is affected by the rotation of the fan, the noise with a frequency of 125 Hz or less is dominant. In order to reduce the noise with a frequency of 125 Hz or less, a thickness of the porous sound absorber in the sound attenuator should be increased. However, it is limited to increase the thickness of the sound absorber in a low-frequency range of 125 Hz or less.

If the porous sound absorber has the sound absorbing ratio of 99%, that is, the sound absorption coefficient of 0.99, it may be referred to as the perfect sound absorber. It is known that in order to achieve such a sound absorption coefficient, the thickness of the absorber should be increased to ¼ wavelength. It can be simply calculated as follows:

TABLE 1

| | ⅓ octave center frequency (Hz) | | | | | |
|---|---|---|---|---|---|---|
| | 40 | 50 | 63 | 80 | 100 | 125 |
| ¼ wavelength (m) | 2.1 | 1.7 | 1.35 | 1.06 | 0.85 | 0.68 |

Accordingly, in order to reduce the noise in the frequency region of 125 Hz or less, it is required to increase the thickness or the length of the splitter. Since the cross-sectional length of the lined duct is usually 1 m or less and the area of the air passage in the sound attenuator for the lined duct is usually about 50% of the total area, the thickness of the splitter may be usually 150 to 300 mm. Therefore, it is significantly difficult to set the sound absorbing ratio at 125 Hz or less to be 0.6 or more by using only the porous sound absorber included in the splitter.

In this context, although it is not a method for increasing the sound absorbing ratio in the sound attenuator, a method for increasing the sound absorbing ratio by combining a porous sound absorber with a sound absorber using resonance due to vibration of a metal plate has been presented (Patent Literature 1).

However, in case of the sound absorber using resonance due to vibration of a plate such as the technique disclosed in Patent Literature 1, since a difference in the sound absorbing ratio may occur depending on a method for fixing edges of the plate or a method for coupling the plate to the sound absorber, it is very difficult to control properties such as the sound absorbing ratio. Therefore, it is not suitable for use in the sound attenuator. Moreover, there is a limitation in increasing the weight or size of the metal plate in the plate-type absorber disclosed in Patent Literature 1 so that there is also limitation in arbitrarily adjusting the resonance frequency.

Further, the plate-type absorber disclosed in Patent Literature 1 includes the metal plate and a rear polymer board. The metal plate should be bonded to the rear polymer board via adhesion and the like. However, since most porous sound absorbers used for the rear polymer board tend to fall off easily due to the weight of the rear polymer board itself when attached to the metal plate, the sound absorber used for the rear polymer board that can be bonded to the metal plate is very limited. For this reason, in Patent Literature 1, the rear polymer board that can be bonded to the metal plate is limited to melamine resin foam that can prevent falling due to the weight.

Moreover, in the plate-type sound absorber, the edges of the metal plate should be fixed consistently. If the porous sound absorbers located on or below the metal plate press the metal plate, the sound absorbing ratio may change.

Meanwhile, regarding the sound attenuator for air ducts, a resonance-type splitter which allows absorption of sound due to the resonance effect of the Helmholtz resonator has been presented (Patent Literature 2). The splitter disclosed in Patent Literature 2 includes an intermediate plate (sound absorbing plate) formed in the center of the splitter and a resonance plate spaced from the intermediate plate and formed on both sides of the intermediate plate. In the space between the intermediate plate and the resonance plate, the sound entering the hole of the resonance plate is extinguished due to the resonance effect, and the remaining sound which is not extinguished due to the resonance effect is absorbed by the intermediate plate to be extinguished.

However, in the technique disclosed in Patent Literature 2, there is only the resonance effect of the perforated plates formed on both sides of the intermediate plate, but there is no relation between the spaces on both sides of the intermediate plate. That is, since the space on one side of the intermediate plate does not play an additional role in the sound absorbing effect in the space on the other side of the intermediate plate, as a result, each of the perforated plates provided on both sides of the intermediate plate may only serve as a separate sound-absorbing layer. Accordingly, the sound absorbing effect of the perforated plate is limited to a very narrow range, i.e., the resonance frequency of Helmholtz resonance. In this case, in order to increase the sound absorbing ratio, it is required to increase the thickness or length of the sound absorber constituting the intermediate plate, and thus the thickness or length of the splitter. However, since the size of the sound attenuator for air ducts is limited as described above, it is practically difficult to increase the sound absorbing ratio by increasing the thickness or length of the splitter.

Therefore, it is still required to develop techniques for improving the sound absorbing property of the sound attenuator of the air conditioning device, in particular, in the low frequency region of 125 Hz or less.

CITATION LIST

Patent Literature

Patent Literature 1: United States Patent Registration No. U.S. Pat. No. 5,975,238 (1999.11.02.)

Patent Literature 2: Korean Patent Registration No. 10-0924958 (2009.10.28.)

SUMMARY

The present invention is to provide splitters which can significantly improve the sound absorbing ratio in the low frequency region of 125 Hz or less and exhibit the sound absorbing effect in the middle and high frequency regions by combining porous sound absorbers with sound absorbers using resonance due to vibration of the perforated plate member without the need to excessively increase the length or thickness of the splitters, and sound attenuators having increased performances.

In one aspect, a splitter in accordance with an embodiment of the present invention may include a first sound absorber; a second sound absorber; a perforated plate member interposed between the first sound absorber and the second sound absorber; an outer frame surrounding the first sound absorber, the second sound absorber and the perforated plate member.

Embodiments of the above splitter may include one or more the following:

Each of the first sound absorber and the second sound absorber may include a porous sound absorber. Each of the first sound absorber and the second sound absorber may include one or more selected from the group consisting of an inorganic fiber, an organic fiber, a chemical fiber, a foamed resin material and a sprayed fiber material. Each of the first sound absorber and the second sound absorber may have a thickness in a range of 50 to 200 mm. The perforated plate member may include one or more selected from the group consisting of a metal plate, a gypsum board, an asbestos cement board, a hard board, plywood, a wood wool board and a synthetic resin plate. The perforated plate member may have a ratio of a total area of pores to an area of the plate member of 1 to 15%. The perforated plate member may further include a cap for holding a pore height, and the cap for holding the pore height may have a hollow shape and have a height which is equal to or greater than the pore height. The outer frame may include a porous plate in which pores are formed in the plate. The outer frame may have a ratio of a total area of pores to an area of the plate of 30 to 50%. The splitter may further include a protective layer surrounding the first sound absorber and a protective layer surrounding the second sound absorber. The perforated plate member may absorb sound by resonance due to vibration of the plate.

In another aspect, a sound attenuator in accordance with another embodiment of the present invention may include a protective case; a plurality of splitters in accordance with the above embodiment which are formed in the protective case and spaced from each other; and an air passage formed among the plurality of splitters.

Embodiments of the above sound attenuator may include one or more the following:

A width of the splitter and a width of the air passage may be adjusted depending on noise attenuation.

These and other aspects, implementations and associated advantages are described in greater detail in the drawings, the description and the claims.

Advantageous Effects

The splitter in accordance with the present invention can remarkably improve the sound absorbing effect, in particular in the low frequency region which accounts for most noises generated in the air conditioning device and simultaneously exhibit the sound absorbing effect in the middle and high frequency region by combining the porous sound absorber and the sound absorber using resonance due to vibration of the perforated plate member without the need to excessively increase the length or thickness of the splitters. Accordingly, the present invention can provide the sound attenuator having improved properties. That is, it is possible to exhibit the significant sound absorbing effect in the low frequency region based on both the resonance effect due to vibration of the perforated plate member and the effect of the first sound absorber or the second sound absorber for enhancing the resonance effect and increasing sound absorption at the resonance frequency and in the frequency region near the resonance frequency. Moreover, it is possible to exhibit the sound absorbing effect in the middle and high frequency region which is suitable for the sound attenuator for the air conditioning device based on the first sound absorber or the second sound absorber which is formed of a porous sound absorber.

Particularly, in accordance with the present invention, since the noise attenuation effect at the desired frequency in the low frequency region is controlled by using resonance due to vibration of the perforated plate member, the resonance frequency can be changed through easy and simple methods, for example, by changing the diameter of the pore and porosity of the perforated plate member so that the sound absorbing effect at the targeted frequency can be maximized.

Therefore, in accordance with the present invention, the sound attenuator can have improved properties by increasing the sound absorbing ratio in the low frequency region of 125 Hz or less that has not been achieved by the common technology in the prior art. As a result, it is possible to remarkably reduce the length of thickness of the sound attenuator by as much as half of the common technology in the prior art.

Further, in accordance with the present invention, there is no restriction on the type of the porous sound absorber that can be applied to the sound attenuator and a constant sound absorbing ratio can be obtained, thereby ensuring uniform performance of the sound attenuator.

DETAILED DESCRIPTION

Various examples and implementations of the disclosed technology are described below in detail with reference to the accompanying drawings.

Hereinafter, the present invention will be described in detail by way of exemplary embodiments of the invention such that the scope and spirit of the inventive concept are easily constructed by one of ordinary skill in the art. Although lots of specific particulars such as concrete configurations are disclosed in description below, such particulars are provided to aid in overall understanding and it is obvious to those of ordinary skill in the art that the present invention may be constructed without such particulars. In addition, while describing the embodiments, detailed descriptions of related well-known functions or configurations that may diminish the clarity of the points of the embodiments of the present invention are omitted.

Figure 1A:
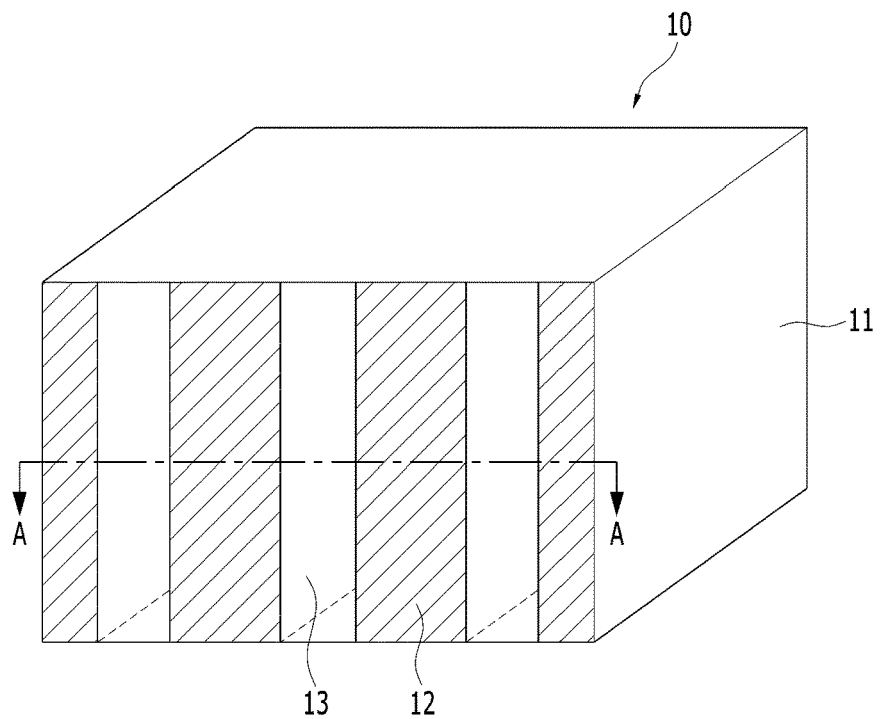
FIG. 1A is a schematic view for illustrating a sound attenuator for an air conditioning device in accordance with a comparative example.
Figure 1B:
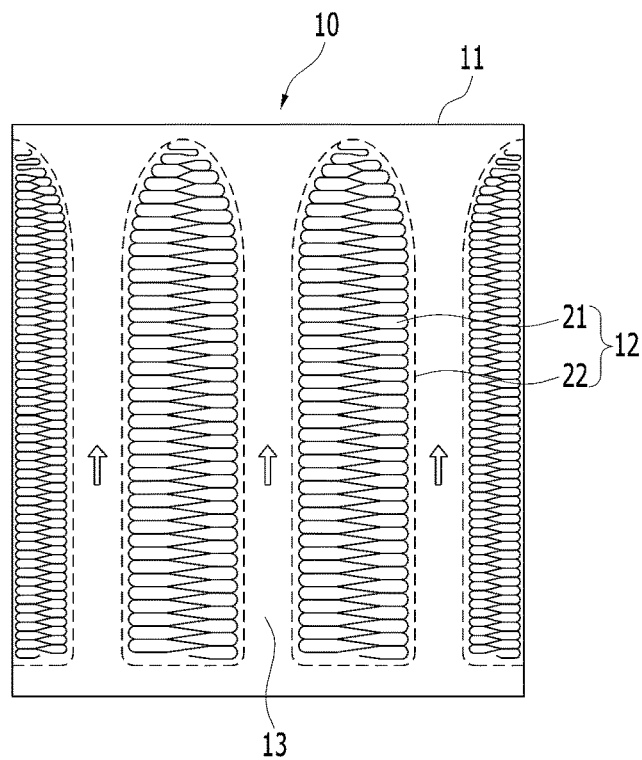
FIG. 1B is a schematic view of a cross-section taken along the line A-A of FIG. 1A.
Figure 2:
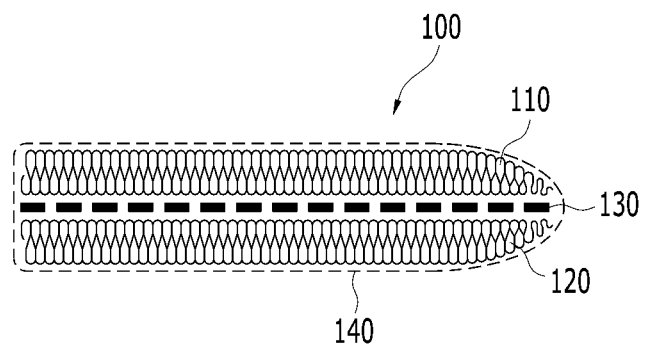
FIG. 2 is a schematic view of a splitter in accordance with an embodiment of the present invention.

FIG. 2 is a schematic view of a splitter in accordance with an embodiment of the present invention.

Referring to FIG. 2, a splitter 100 in accordance with an embodiment of the present invention may include a first sound absorber 110, a second sound absorber 120, a perforated plate member 130 interposed between the first sound absorber 110 and the second sound absorber 120 and an outer frame 140 surrounding the first sound absorber 110, the second sound absorber 120 and the perforated plate member 130.

The first sound absorber 110 and the second sound absorber 120 may serve to absorb sound in the middle and high frequency region, for example, at a frequency of 250 Hz or more and improve the resonance effect due to vibration of the perforated plate member 130, thereby increasing the sound absorbing ratio in a wide frequency range such as not only at the resonance frequency but also in the frequency region near the resonance frequency.

That is, when noise passes near the first sound absorber 110 of the splitter 100, the first sound absorber 110 can serve to absorb sound at the middle and high frequency and the perforated plate member 130 and the second sound absorber 120 can serve to absorb sound at the low frequency based on the resonance effect due to vibration of the perforated plate member 130 and the effect for improving the sound absorbing ratio by enhancing the resonance effect. In contrary, when noise passes near the second sound absorber 120, the second sound absorber 120 can serve to absorb sound at the middle and high frequency and the perforated plate member 130 and the first sound absorber 110 can serve to absorb sound at the low frequency based on the resonance effect due to vibration of the perforated plate member 130 and the effect for improving the sound absorbing ratio by enhancing the resonance effect.

To this end, the first sound absorber 110 and the second sound absorber 120 may include a porous sound absorber, respectively.

The porous sound absorber has a plurality of pores in the shape of small bubbles or thin tubes on the surface of the absorber and inside the absorber. Air in the pores may be vibrated by the sound waves to generate friction and sound energy is converted into thermal energy due to the friction and absorbed. The sound absorption performance may vary depending on porosity or the thickness of the sound absorber.

Examples of the porous sound absorber which can be used for the first sound absorber 110 and the second sound absorber 120 may include an inorganic fiber such as glass wool, rock wool, ceramic wool, and the like, an organic fiber such as felt and the like, a chemical fiber such as polyester wool and the like, a foamed resin material such as polyurethane, melamine and the like and a sprayed fiber material, but are not limited thereto.

The first sound absorber 110 and the second sound absorber 120 may be formed of the same material as each other, or may be formed of different materials from each other.

The thickness of each of the first sound absorber 110 and the second sound absorber 120 may be 50 to 200 mm, preferably 75 to 150 mm, respectively. If the thickness of each of the first sound absorber 110 and the second sound absorber 120 is less than 50 mm respectively, the sound absorbing effect at the frequency of 250 Hz or more may be decreased so that the noise attenuation effect cannot be sufficiently exhibited. If the thickness of each of the first sound absorber 110 and the second sound absorber 120 is greater than 200 mm respectively, the thickness of the splitter is excessively increased so that the splitter cannot be practically used in the sound attenuator.

The thicknesses of the first sound absorber 110 and the second sound absorber 120 may be the same as, or different from each other.

Although they are not shown, a protective layer surrounding the first sound absorber 110 and a protective layer surrounding the second sound absorber may be further included in the surface of each of the first sound absorber 110 and the second sound absorber 120, respectively, in order to prevent scattering of the porous sound absorber. The protective layer may be formed of a glass fiber fabric, a polyester film and the like, but are not limited thereto.

The perforated plate member 130 may be interposed between the first sound absorber 110 and the second sound absorber 120 and serve to absorb sound at the low frequency region, for example, at the frequency of 125 Hz or less by resonance due to vibration of the plate. When the sound wave enters the pore of the perforated plate member 130, the energy of the sound wave may vibrate the air inside the pore to generate resonance. At this time, the energy of the sound wave may be converted into kinetic energy of the air molecule and absorbed.

As the perforated plate member 130, existing porous plates may be used. Alternatively, the perforated plate member 130 may be formed by perforating metal plates. Examples of the plate member which can be used for the perforated plate member 130 may include a metal plate such as an aluminum plate or an iron plate, a gypsum board, an asbestos cement board, a hard board, plywood, a wood wool board, a synthetic resin plate and the like, but are not limited thereto.

For the perforated plate member 130, it is important to design the pore size, porosity and thickness in order to set the resonance frequency to be 125 Hz or less so as to efficiently absorb sound in the desired low frequency region. This will be explained in detail with reference to FIGS. 3, 4A and 4B.

Figure 3:
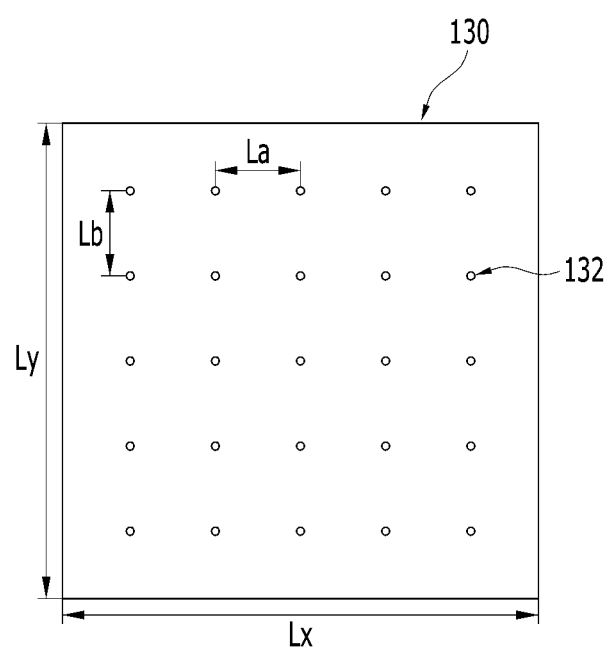
FIG. 3 is a schematic view of a cross-section of a perforated plate member in accordance with an embodiment of the present invention.

FIG. 3 is a schematic view of a cross-section of a perforated plate member in accordance with an embodiment of the present invention.

Referring to FIG. 3, the perforated plate member 130 may include a plurality of pores 132. The fundamental resonance frequency ($f_{p0}$) of the perforated plate member 130 may be calculated as follows:

$$f_{p0} = \sqrt{(9D\pi^2/4h\rho\xi^4)} \sqrt{\xi^2 L_x^2 + 3\xi^2 L_y^2 + 2\xi^2 + 2\xi^2(1-\sigma^2)}$$

$$\xi = \frac{(1-\mu)L_a L_b L_x L_y}{\pi r^2}$$

wherein:
D: Flexural rigidity of plate
h: Thickness of plate
ρ: Volume density of plate
σ: Poisson's ratio of plate
μ: Porosity (ratio of a total cross-sectional area of pores to a cross-sectional area of plate)
r: Radius of pore As confirmed in the above formula, it is possible to readily set the fundamental resonance frequency ($f_{p0}$) of the perforated plate member 130 to be 125 Hz or less by adjusting the thickness and the porosity of the perforated plate member 130 and the diameter of the pore.

The porosity of the perforated plate member 130, that is, the ratio of the total area of pores 130 to the area of the plate member may be preferably 1 to 15%. If the porosity of the perforated plate member 130 is less than 1%, it is difficult to design a resonator in view of the area of the plate member 130. If the porosity of the perforated plate member 130 is greater than 15%, the effect of the resonator may be significantly decreased.

The diameter of the pore and the spacing between the pores may be determined according to the porosity of the perforated plate member 130 and thus, suitably selected so as to satisfy the porosity.

The pore may be formed in various cross-sectional shapes, for example a circle, a square, a rectangle and the like, but the shapes are not limited thereto.

The perforated plate member 130 may be formed in a plate shape, for example in a plate shape such as a square plate or a rectangular plate.

The thickness of the perforated plate member 130 may vary depending on a material of the plate. For example, when the perforated plate member 130 is formed of metal plates, the thickness of the plate may be in a range of 0.5 to 3 mm, and when the perforated plate member 130 is formed of synthetic plastics, the thickness of the plate may be in a range of 1 to 6 mm. However, the thickness of the perforated plate member 130 is not limited thereto.

In particular, in designing the resonance frequency, it is important to keep the height of the pores 132 of the perforated plate member 130 uniform. Thus, it may be required to prevent the air layer in the pores 132 from being blocked by the first sound absorber 110 and the second sound absorber 120 disposed around the pores 132. When the perforated plate member 130 is formed of a non-metal plate having a thickness of 6 mm or more such as a gypsum board, a wood wool board and the like, the height of the pores 132 can be uniformly maintained. However, when the perforated plate member 130 is formed of a metal plate, since the thickness of the metal plate is very thin, for example, to about 1 mm, the first sound absorber 110 and the second sound absorber 120 disposed around the pores 132 may block the air layer in the pores. A method for solving such a problem will be described in detail with reference to FIGS. 4A and 4B.

Figure 4A:
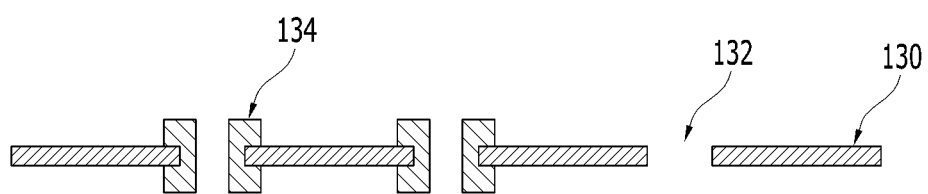
FIG. 4A is a schematic view of a cross-section of a perforated plate member to which a cap for holding a pore height is applied in accordance with an embodiment of the present invention.
Figure 4B:
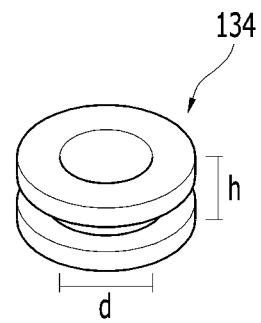
FIG. 4B is a schematic view of a cap for holding a pore height in accordance with an embodiment of the present invention.

FIG. 4A is a schematic view of a cross section of a perforated plate member to which a cap for holding a pore height is applied in accordance with an embodiment of the present invention, and FIG. 4B is a schematic view of a cap for holding a pore height in accordance with an embodiment of the present invention.

Referring to FIG. 4A, in order to prevent the air layer in the pores 132 from being blocked by the first sound absorber 110 and the second sound absorber 120 disposed around the pores 132, the perforated plate member 130 may include a cap for holding a pore height 134 to uniformly maintain the height of the pores 132.

As shown in FIG. 4B, the cap for holding the pore height 134 may have a hollow shape. The inner diameter (d) of the cap for holding a pore height 134 may correspond to the diameter of the pores 132 and the height (h) may be suitably selected so as to prevent blocking of the pores 132 and maintain the height of the pores 132. It is possible to maintain the height of the pores 132 and prevent blocking of the air layer by applying the cap for holding the pore height 134 to the pores 132 of the perforated plate member 130.

Referring back to FIG. 2, the outer frame 140 may serve to protect the first sound absorber 110, the perforated plate member 130 and the second sound absorber 120 disposed in the outer frame 140 and form a frame.

The outer frame 140 may be formed of any material suitable for performing such functions, preferably a metal.

The outer frame 140 may be formed of a porous plate. The porous plate may be a thin plate having a plurality of pores and have porosity, i.e., a ratio of a total area of pores to an area of the plate of 30 to 50%. This is to prevent absorption of the sound wave from being interfered due to the fact that sound is reflected off the surface of the porous plate. The lower limit of the porosity of the outer frame 140, i.e., 30% is the minimum range that does not recognize the surface as a resistor in the process of sound absorption, acoustically. And, it is practically difficult to make the maximum porosity greater than 50% in view of the manufacturing process for the porous plate.

The outer frame 140 may be formed in a streamlined shape. This is to prevent deterioration of performances of the splitter 100 by reducing the resistance to air flow and thereby reducing the pressure loss.

When the splitter 100 is applied to the sound attenuator, performances of the sound attenuator may be decreased as the pressure loss is increased. The pressure loss indicates a decrease in air pressure generated when air passes through the sound attenuator. Therefore, the splitter 100 may be formed in a streamlined shape to reduce the resistance to air flow and thereby reduce the pressure loss.

According to the splitter 100 in accordance with the embodiment of the present invention, it is possible to exhibit the significant sound absorbing effect in the low frequency region based on both the resonance effect due to vibration of the perforated plate member 130 and the effect of the first sound absorber 110 and the second sound absorber 120 for enhancing the resonance effect and increasing sound absorption at the resonance frequency and in the frequency region near the resonance frequency. Moreover, it is possible to exhibit the sound absorbing effect in the middle and high frequency region which is suitable for the sound attenuator for the air conditioning device based on the first sound absorber 110 and the second sound absorber 120 which is formed of the porous sound absorber.

The splitter 100 in accordance with the embodiment of the present invention may be formed in a simple manner, for example, by sequentially disposing the first sound absorber 110, the perforated plate member 130 and the second sound absorber 120 in the outer frame 140 including an opening and then closing the opening with the same material as the outer frame 140, or by disposing the first sound absorber 110 and the second sound absorber 120 in the outer frame 140 including the opening, and interposing the perforated plate member 130 between the first sound absorber 110 and the second sound absorber 120, and then closing the opening with the same material as the outer frame 140. Alternatively, the splitter 100 in accordance with the embodiment of the present invention may be formed by sequentially disposing the first sound absorber 110, the perforated plate member 130 and the second sound absorber 120 to form a stacked structure and then forming the outer frame 140 surrounding the stacked structure, or by disposing the first sound absorber 110 and the second sound absorber 120, interposing the perforated plate member 130 between the first sound absorber 110 and the second sound absorber 120 to form a stacked structure and then forming the outer frame 140 surrounding the stacked structure.

Thus, since the splitter 100 in accordance with the embodiment of the present invention may be formed by simply disposing and/or inserting each component without having to bond each component by using adhesives, the manufacturing process is easy and there is no possibility of causing a hazard problem due to the adhesives.

Moreover, since the splitter 100 in accordance with the embodiment of the present invention may be formed not by bonding methods but by disposing and/or inserting the first sound absorber 110, the perforated plate member 130 and the second sound absorber 120 in the outer frame 140, kinds of the porous sound absorber used as the first sound absorber 110 and the second sound absorber 120 are not limited. Further, it is possible to uniformly secure the performance of the sound attenuator by achieving a uniform sound absorbing ratio.

The splitter 100 in accordance with the embodiment of the present invention can be applied to the sound attenuator and effectively reduce noises.

Figure 5A:
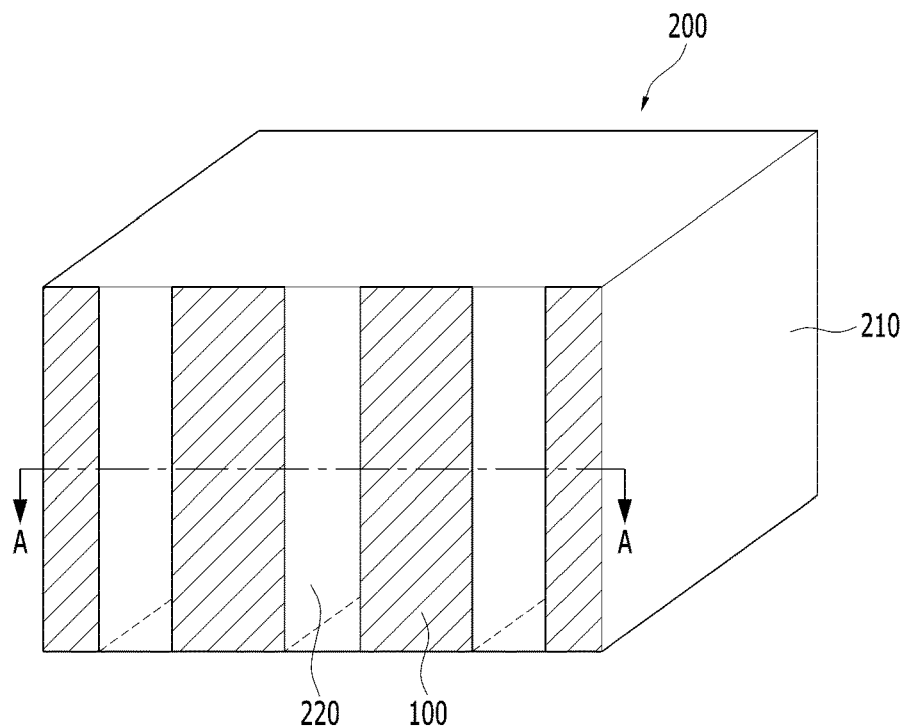
FIG. 5A is a schematic view of a sound attenuator in accordance with an embodiment of the present invention.
Figure 5B:
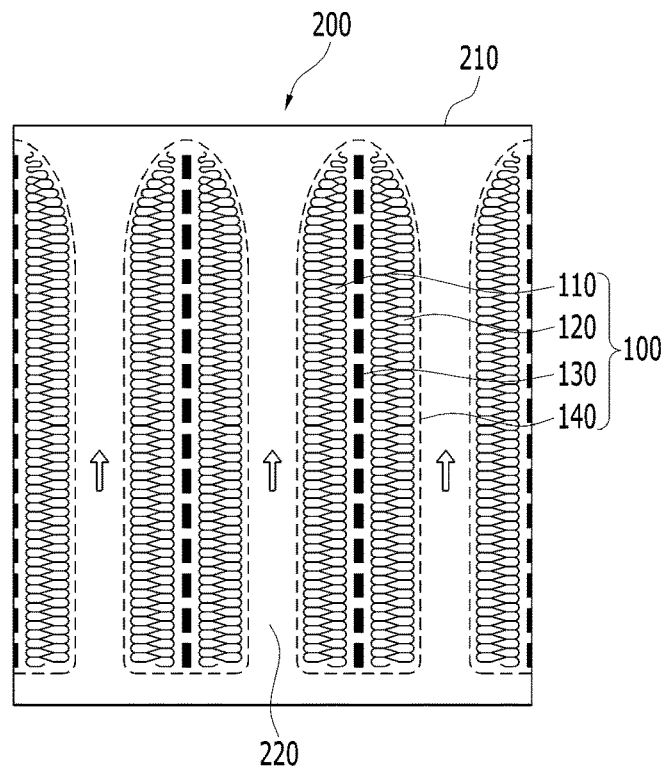
FIG. 5B is a schematic view of a cross-section taken along the line A-A of FIG. 5A.

FIG. 5A is a schematic view of a sound attenuator in accordance with an embodiment of the present invention, and FIG. 5B is a schematic view of a cross-section taken along the line A-A of FIG. 5A.

Referring to FIGS. 5A and 5B, a sound attenuator 200 in accordance with the embodiment of the present invention may include a protective case 210 forming an outer frame of the sound attenuator and a plurality of splitters 100 formed in the protective case 210 at a predetermined distance from each other. Air passages 220 may be formed among the plurality of splitters 100. The air flow may be indicated by an arrow in FIG. 5B.

The plurality of splitters 100 may be installed in the protective case 210 and spaced apart from each other. If the widths (thicknesses) of the splitter 100 and the air passage 220 are changed, the noise attenuation according to the frequency region may be changed. Therefore, the widths of the splitter 100 and the air passage 220 may be suitably adjusted in order to achieve the desired noise attenuation for the purpose of the sound attenuator 200.

In one embodiment, the width of each of the splitters 100 may be the same as the width of each of the air passages 220.

Alternatively, in another embodiment, the width of each of the splitters 100 may be different from the width of each of the air passages 220.

Although, if the thickness of the sound absorber is decreased, the noise attenuation may be usually increased, the sound absorber may exhibit poor properties in the low frequency region. Accordingly, considering these characteristics, the width of the splitter 100 and the width of the air passage 220 may be appropriately adjusted to maximize the sound absorbing ratio in a desired frequency region.

The protective case 210 may be formed of a metal material and the like, but is not limited thereto.

Although it is not shown, the sound attenuator 200 may further include a flange capable of being connected with a duct before and behind the protective case 210.

Since the sound attenuator 200 in accordance with the embodiment of the present invention includes the splitter 100 including the first sound absorber 110 and the second sound absorber 120 formed of the porous sound absorber and perforated plate member 130 using resonance due to vibration of the plate, it is possible to remarkably improve the sound absorbing effect, in particular in the low frequency region which accounts for most noises generated in the air conditioning device and simultaneously exhibit the sound absorbing effect suitable for the sound attenuator for the air conditioning device in the middle and high frequency region, without the need to excessively increase the length or thickness of the splitters. In particular, the sound attenuator 200 in accordance with the embodiment of the present invention can significantly improve the sound absorbing ratio in the low frequency region of 125 Hz or less that has not been achieved by the common technology in the prior art so as to secure the superior performance of the sound attenuator. As a result, it is possible to remarkably reduce the length of thickness of the sound attenuator by as much as half of the common technology in the prior art.

Hereinbelow, the present invention will be described in more detail with reference to the following examples. These examples are provided only for illustration of the present invention and should not be construed as limiting the scope and spirit of the present invention.

EXAMPLE (1) Sound Absorbing Ratio Test

For the sound absorbing ratio test, an example including a porous sound absorber (100 mm), a perforated iron plate (1 mm) and a porous sound absorber (100 mm) and a comparative example including a porous sound absorber (200 mm) in accordance with the common technology in the prior art were prepared in an area of 12 m², respectively.

The sound absorbing ratio test was performed according to KS F 2805 (Reverberation Room Method sound absorption coefficient) and designed to generate resonance at 80 Hz in the pore. Results are shown in FIG. 6.

Figure 6:
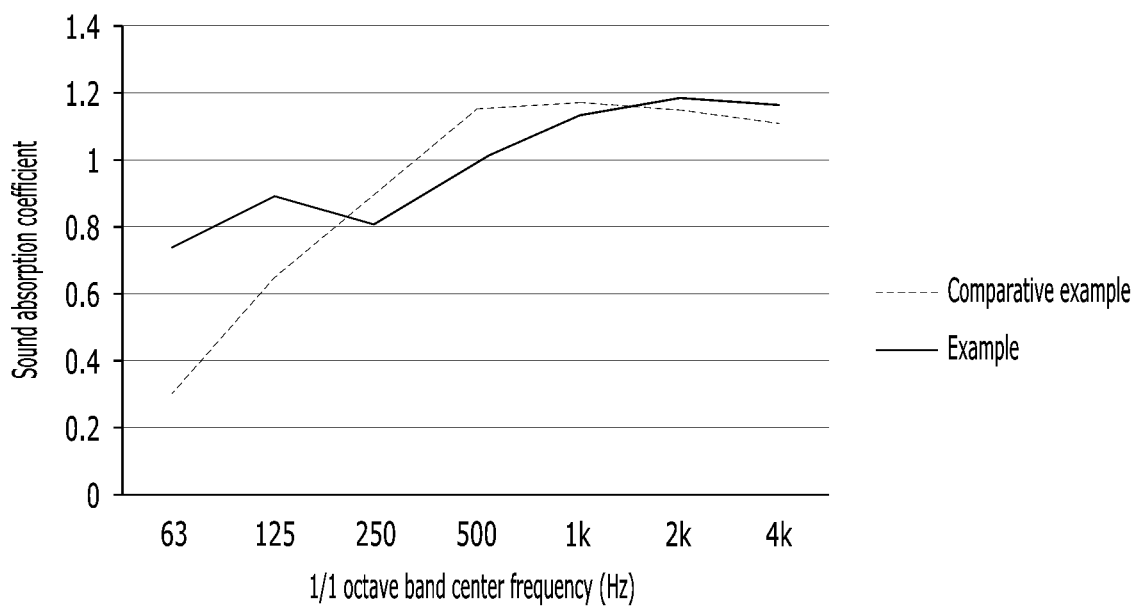
FIG. 6 is a graph for illustrating sound absorbing ratios of splitters in accordance with an example and a comparative example.

Referring to FIG. 6, it is confirmed that the example has a remarkably improved sound absorbing ratio, particularly in the frequency region of 125 Hz or less due to resonance caused by vibration of the plate in comparison with the comparative example.

(2) Performance Test for the Sound Attenuator

Performance of the sound attenuator was performed based on the results of the above sound absorbing ratio test. Splitters were fabricated by surrounding each of the sound absorbers in accordance with the example and the comparative example prepared as above (1) with a porous plate, respectively. Then, the splitters were installed in the sound attenuators as shown in FIG. 5A. The sound attenuators were manufactured in a size of 600 mm (height)×1200 mm (width)×1800 mm (length), respectively.

In order to determine performances of the sound attenuators, a test of insertion loss for the sound attenuators was performed under the condition of no air flow according to KS I ISO 7235 (Acoustics-Laboratory measurement procedures for ducted silencers and air-terminal units). Results are shown in FIG. 7.

Insertion loss is a difference in the radiated sound power between when the sound attenuator is present in the sound source and when the sound attenuator is absent.

Figure 7:
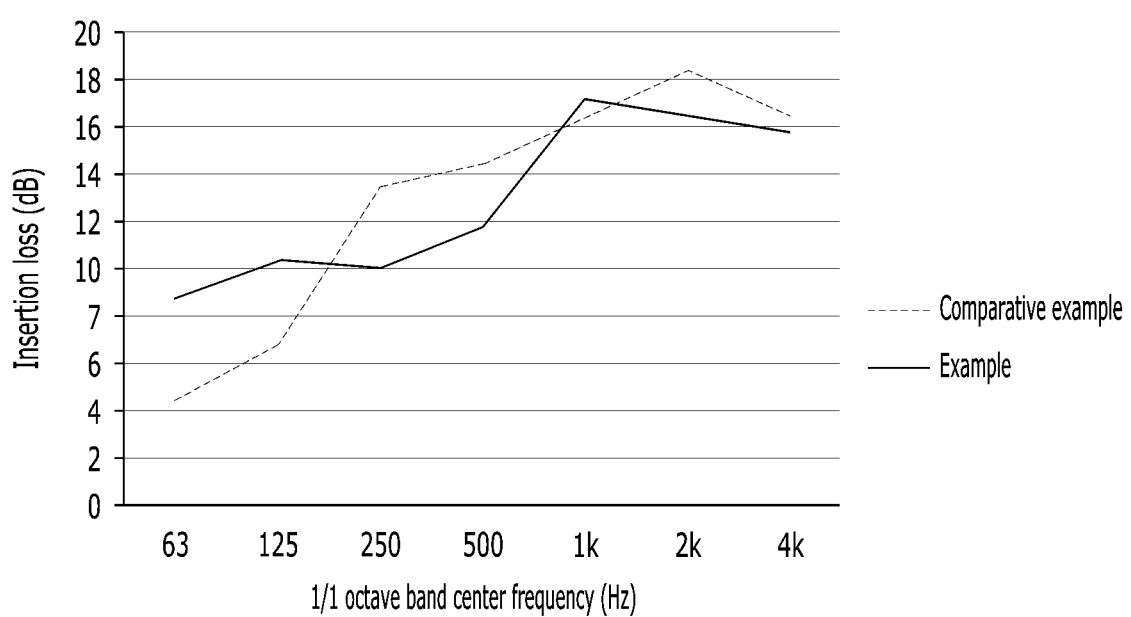
FIG. 7 is a graph for illustrating performances of sound attenuators in accordance with an example and a comparative example.

Referring to FIG. 7, the example has large insertion loss in the low frequency region of 125 Hz or less due to resonance caused by vibration of the plate in comparison with the comparative example. Therefore, the sound attenuator in accordance with the example can exhibit a remarkable performance, particularly, in the low frequency region of 125 Hz or less, and thus, it is possible to remarkably reduce the length of the sound attenuator by as much as half of the common technology in the prior art As such, in accordance with the present invention, it is possible to exhibit the significant sound absorbing effect in the low frequency region based on both the resonance effect due to vibration of the perforated plate member and the effect of the first sound absorber or the second sound absorber for enhancing the resonance effect and simultaneously exhibit the sound absorbing effect in the middle and high frequency region which is suitable for the sound attenuator for the air conditioning device based on the first sound absorber or the second sound absorber by applying the splitter including the first sound absorber and the second sound absorber which are formed of the porous sound absorber and the perforated plate member inserted therebetween to the sound attenuator. Therefore, when the sound attenuator is applied to the air-conditioning device in which noise in the low frequency region of 125 Hz or less is dominated, noise can be effectively reduced without the need to excessively increase the length or thickness of the splitters.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described. Other implementations, enhancements and variations can be made based on what is described and illustrated in this patent document.

What is claimed is:

1. A splitter comprising:
a first sound absorber;
a second sound absorber;
a perforated plate member interposed between the first sound absorber and the second sound absorber; and
an outer frame surrounding the first sound absorber, the second sound absorber and the perforated plate member;
wherein the perforated plate member has a fundamental resonance frequency ($f_{p0}$) of 125 Hz or less, which is calculated according to the follow equations:

$$f_{p0} = \sqrt{(9D\pi^2/4h\rho\xi^4)} \sqrt{\xi^2 L_x^2 + 3\xi^2 L_y^2 + 2\xi^2 + 2\xi^2(1-\sigma^2)}$$

$$\xi = \frac{(1-\mu)L_a L_b L_x L_y}{\pi r^2},$$

wherein
D: Flexural rigidity of the perforated plate member,
h: Thickness of the perforated plate member,
ρ: Volume density of the perforated plate member,
σ: Poisson's ratio of the perforated plate member,
μ: Porosity (ratio of a total cross-sectional area of pores to a cross-sectional area of the perforated plate member),
r: Radius of pores,
$L_a$: Horizontal pitch between pores,
$L_b$: Vertical pitch between pores,
$L_x$: Horizontal length of the perforated plate member, and
$L_y$: Vertical length of the perforated plate member.

2. The splitter of claim 1, wherein each of the first sound absorber and the second sound absorber comprises a porous sound absorber.

3. The splitter of claim 1, wherein each of the first sound absorber and the second sound absorber comprises one or more selected from the group consisting of an inorganic fiber, an organic fiber, a chemical fiber, a foamed resin material and a sprayed fiber material.

4. The splitter of claim 1, wherein each of the first sound absorber and the second sound absorber has a thickness in a range of 50 to 200 mm.

5. The splitter of claim 1, wherein the perforated plate member comprises one or more selected from the group consisting of a metal plate, a gypsum board, an asbestos cement board, a hard board, plywood, a wood wool board and a synthetic resin plate.

6. The splitter of claim 1, wherein the perforated plate member has a ratio of a total area of pores to an area of the plate of 1 to 15%.

7. The splitter of claim 1, wherein the perforated plate member further comprises a cap for holding a pore height, wherein the cap for holding the pore height has a hollow shape and has a height which is equal to or greater than the pore height.

8. The splitter of claim 1, wherein the outer frame comprises a porous plate in which pores are formed in the plate.

9. The splitter of claim 1, wherein the outer frame has a ratio of a total area of pores to an area of the plate of 30 to 50%.

10. The splitter of claim 1, further comprising a protective layer surrounding the first sound absorber and a protective layer surrounding the second sound absorber.

11. The splitter of claim 1, wherein the perforated plate member absorbs sound by resonance due to vibration of the plate and resonance caused by vibration of air inside pores.

12. A sound attenuator comprising:
a protective case;
a plurality of splitters according to claim 1 formed in the protective case and spaced from each other; and
an air passage formed among the plurality of splitters.

13. The sound attenuator according to claim 12, wherein a width of each of the plurality of splitters and a width of the air passage are adjusted according to noise attenuation.

14. A splitter comprising:
a first sound absorber;
a second sound absorber;
a perforated plate member interposed between the first sound absorber and the second sound absorber; and an outer frame surrounding the first sound absorber, the second sound absorber and the perforated plate member;

wherein each of the first and second sound absorbers is a porous sound absorber;

wherein the perforated plate member has a ratio of a total area of pores to an area of the plate of 1 to 15%; and wherein the perforated plate member absorbs sound by resonance due to vibration of the plate and resonance caused by vibration of air inside the pores of the perforated plate member.

15. The splitter of claim 14, wherein the perforated plate member further comprises a cap for holding a pore height, wherein the cap for holding the pore height has a hollow shape and has a height which is equal to or greater than the pore height.

16. The splitter of claim 14, wherein each of the first sound absorber and the second sound absorber comprises one or more selected from the group consisting of an inorganic fiber, an organic fiber, a chemical fiber, a foamed resin material and a sprayed fiber material.

17. The splitter of claim 14 wherein each of the first sound absorber and the second sound absorber has a thickness in a range of 50 to 200 mm.

18. The splitter of claim 14, wherein the perforated plate member comprises one or more selected from the group consisting of a metal plate, a gypsum board, an asbestos cement board, a hard board, plywood, a wood wool board and a synthetic resin plate.

19. The splitter of claim 14, wherein the outer frame comprises a porous plate having a streamlined shape.

20. The splitter of claim 19, wherein the outer frame has a ratio of a total area of pores to an area of the plate of 30 to 50%, and wherein a protective layer surrounds each of the first and second sound absorbers.

* * * * *